Patented Jan. 16, 1923.

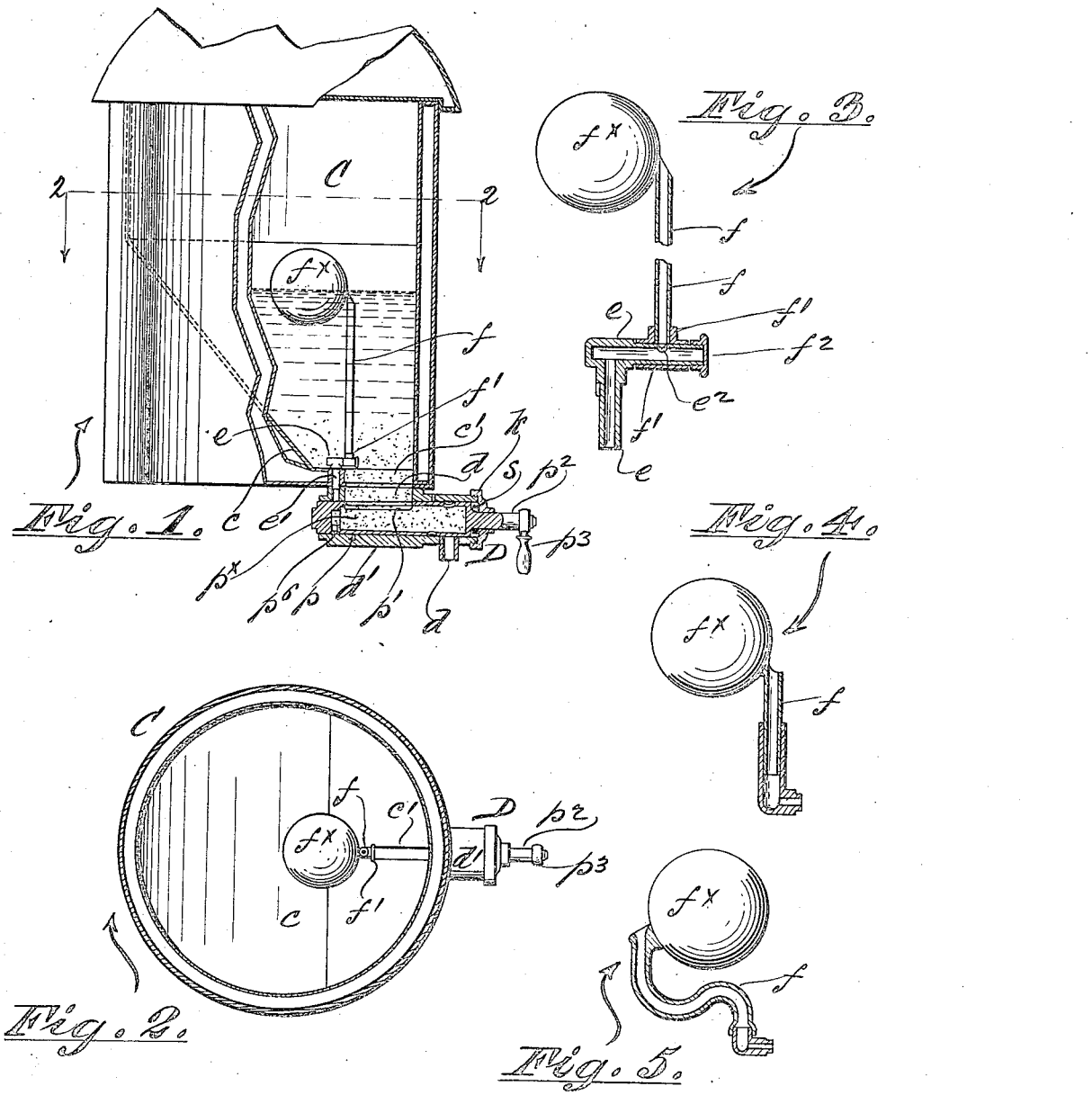

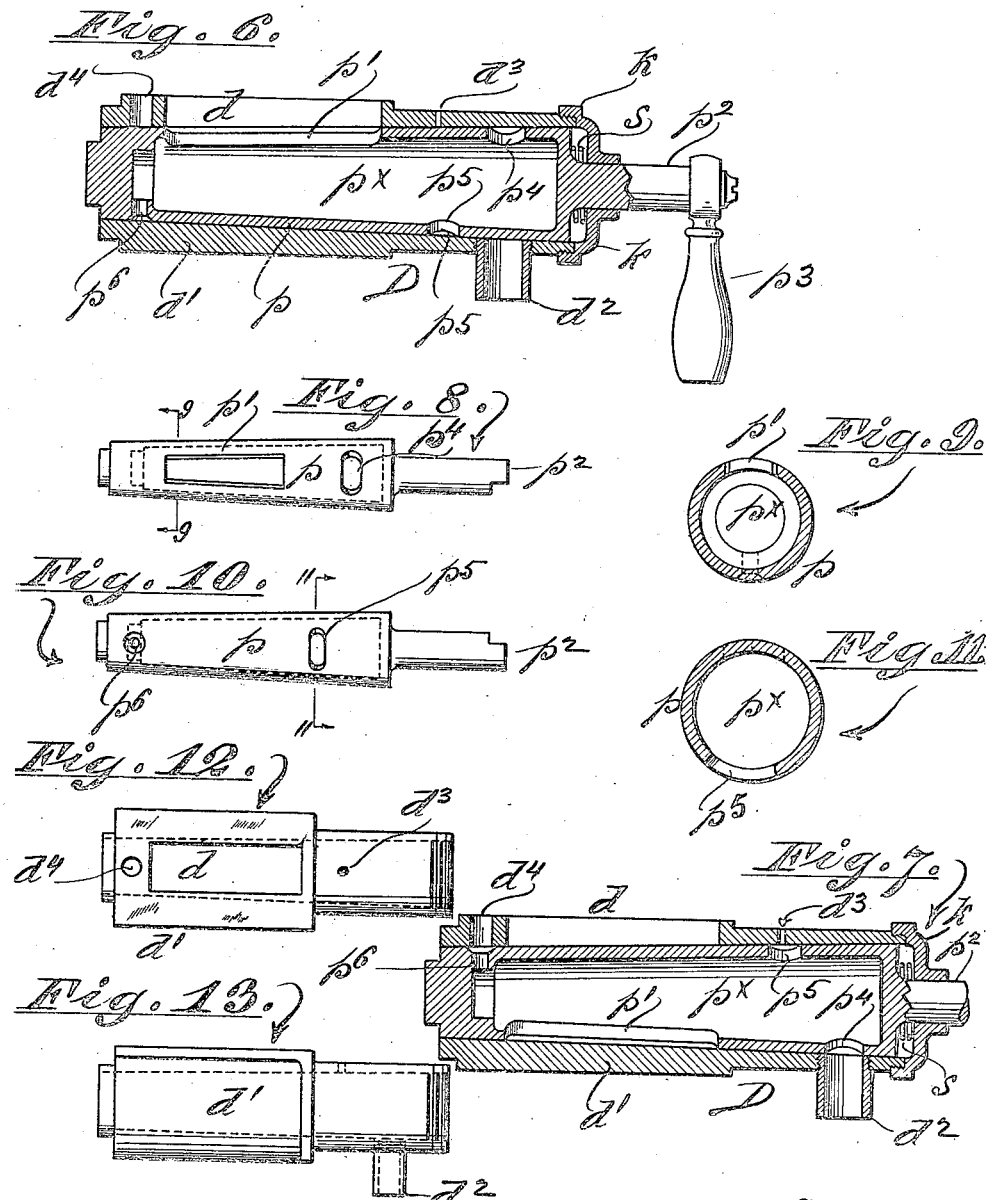

1,442,435

UNITED STATES PATENT OFFICE.

HARRY C. LYONS, OF NEW YORK, N. Y.

DISPENSING MEANS FOR BEVERAGES CONTAINING CHOCOLATE, COCOA, ETC.

Application filed November 4, 1921. Serial No. 512,719.

*To all whom it may concern:*

Be it known that I, HARRY C. LYONS, a citizen of the United States, and a resident of the borough of Manhattan, city, county, and State of New York, have invented certain new and useful Improvements in Dispensing Means for Beverages Containing Chocolate, Cocoa, Etc., of which the following is a specification.

My improvements appertain to the type of dispensing apparatus set forth in Letters Patent No. 1,367,823, issued to me Feb. 8, 1921, and relate more particularly to the arrangement and construction of the dispensing faucet used in conjunction with the floatable drain duct which is a distinctive feature of my fluid dispensers generally, as exemplified first in Letters Patent No. 1,181,783, issued to me May 2, 1916, and in subsequent patents for milk and cream dispensing apparatus.

As set forth more particularly in the aforesaid Letters Patent No. 1,367,823, in the preparation of beverages containing chocolate, cocoa and the like the extract of cocoa is diluted more or less with hot milk and water, and is only partially dissolved thereby, the admixture being a solution in which the heavier constituents settle to the bottom thereof and constitute a sediment of viscid, semi-fluid character, while the upper part of the concoction is relatively thin and fluent. Hence, in dispensing beverages of this character, it was formerly necessary to stir and agitate the admixture preparatory to pouring, or to prepare the same in small quantities for immediate use,—disadvantages which I obviate by my method of utilizing the flow of the more fluid constituents as a vehicle to flush out the heavier constituents of the admixture substantially as set forth in said Letters Patent No. 1,367,823.

My present improvements are designed to overcome certain objections incidental to the form of dispensing faucet shown therein, in which the chocolate receiving compartment thereof is continuously in communication with the heavier semi-fluid constituents, so that on the flushing out of said pocket by the lighter liquid vehicle the latter is apt to draw off more than the prescribed or desired quantity of chocolate syrup, so called. In other words, the faucet shown and described in said Letters Patent is not a measuring faucet in the strict sense of the word, and does not accurately prescribe the quantity of chocolate-saturated syrup discharged when the valve plug is turned to open communication with the channel through which the lighter liquid contents of the urn pass to discharge spout. Furthermore, under certain conditions, clogging of the faucet is apt to occur by reason of said continuous communication between the receiving pocket in the faucet and the area of concentrated chocolate solution, especially when the latter is surcharged and pasty in character.

These difficulties I obviate by my present invention, which consists essentially in the specific construction, combination, and arrangement of parts and appurtenances herein described and claimed,—a distinctive feature being the provision of a rotatable valve plug formed with a measuring compartment which is cut off from the chocolate-syrup supply when the faucet is used for dispensing purposes, while at the same time communication is established with the floatable drain duct, whereby the fluid contents of the upper portion of the urn is utilized to effect the washing out and discharge of said chocolate syrup measuring chamber, as hereinafter more fully set forth.

In the accompanying drawings,

Fig. 1, is a partial central vertical sectional elevation of a dispensing urn for cocoa beverages, embodying the essential features of my invention;

Fig. 2, is a horizontal section thereof, taken upon plane of line 2—2, Fig. 1;

Fig. 3, is a central longitudinal section of the floatable drain duct, and appurtenant parts, the float being shown in elevation;

Fig. 4, is a similar view of a modified form of floatable drain tube, of telescopic character;

Fig. 5, is a similar view of another modified form of floatable drain duct, in which a flexible tube is utilized for the purpose;

Fig. 6, is a central longitudinal sectional elevation, upon an enlarged scale, of my improved dispensing faucet, in closed position;

Fig. 7, is a like view of the faucet in position for discharge;

Fig. 8, is a view of the normally upper side of the valve plug;

Fig. 9, is a transverse section taken upon plane of line 9—9, Fig. 8, but upon a larger scale;

Fig. 10, is a view of the normally under side of the valve plug;

Fig. 11, is a transverse section taken upon plane of line 11—11, Fig. 10, but only on a larger scale;

Fig. 12, is a view of the upper side of the valve plug casing;

Fig. 13, is a side elevation thereof.

C, represents an urn or container of any desired or suitable construction and external configuration, designed for the reception and storage, temporarily, of the constituents of the cacao beverage to be dispensed through the faucet D. The rear portion of the floor $c$, of the reservoir is preferably convergently inclined toward said dispensing faucet D, as shown particularly in Fig. 1, of the drawings, for the purpose of concentrating the sedimentary constituents of the concoction in suitable juxtaposition to the outlet $c'$, which communicates with the inlet $d$, in the upper side of the casing $d'$, in which latter the valve plug $p$, is mounted, said casing being attached rigidly and permanently to the under side of the urn C, by any suitable means.

The valve plug $p$, is slightly conical, tapering rearward, and is held to its concavo-conoidal seat in the casing $d'$, by a spring $s$, interposed between its forward extremity and a cap $k$, screwing onto the outer end of the valve casing $d'$, as shown more particularly in Figs. 1, 6 and 7. Near its forward extremity said casing $d'$, is formed with the discharge spout $d^2$.

The valve plug $p$, is formed with an elongated inlet port $p'$, on its normally upper side, which, when the valve is closed to the discharge spout $d^2$, coincides with the inlet $d$, in the casing $d'$, as shown in Figs. 1, and 6, thereby admitting the semi-fluid sedimentary deposit in the lower part of the reservoir C, to the measuring chamber $p^x$, in said valve plug $p$, as indicated more particularly in Fig. 1. The valve plug $p$, is of course provided with the usual stem $p^2$, and handle $p^3$, to facilitate manipulation, a half turn of said plug in either direction sufficing to open or close the faucet as the case may be.

On the same side of the valve plug $p$, as the inlet port $p'$, is the discharge port $p^4$, which, when the plug is reversed or turned into position for discharge, coincides with the spout $d^2$, of the casing $d'$, as shown in Fig. 7. When the valve plug $p$, is in this position its vent port $p^5$, coincides with the vent hole $d^3$, in the upper side of the casing $d'$, so as to facilitate the discharge of the contents of the measuring chamber $p^x$. Likewise, when the valve plug is thus reversed from normal position, its rear inlet port $p^6$, coincides with the fluid vehicle inlet port $d^4$, in the casing $d$, as also shown in said Fig. 7, said inlet port $p^6$, being on the side of the valve plug opposite to that on which the inlet port $p'$, and discharge port $p^4$, are situated.

The vehicle inlet port $p^4$, acts in part as a socket for the discharge duct $e'$, forming the lower extension of the hollow trunnion $e$, on which the knuckle sleeve $f'$, of the floatable drain tube $f$, is mounted as heretofore in my float-drain type of liquid dispensers,—the lower end of said floatable drain tube $f$, communicating through a port $e^2$, with the interior of the hollow trunnion $e$, as shown in Fig. 3, and the sleeve $f'$, being held on the trunnion $e$, by a cap screw $f^2$. The float $f^x$, is attached to the upper end of the drain tube $f$, as heretofore. The inlet $e^2$, is of shape and area sufficient to maintain communication with the lower end of the floatable duct $f$, irrespective of the liquid level within the reservoir C; and the float $f^x$, maintains the mouth of the said drain tube $f$, a sufficient distance below the liquid level to insure a flow of liquid upon occasion, while avoiding contact with the "skin" or "scum" that is apt to collect and float on the top thereof.

Thus, upon turning the valve plug $p$, into the position shown in Fig. 7, a flow of relatively thin vehicle liquid will be induced through the drain duct $f$, trunnion $e$, duct $e'$, and inlet port $p^6$, into and through the measuring chamber $p^x$, which thus becomes also essentially a mixing chamber, in that the diluted milk (which ordinarily forms the flushing vehicle) mingles with and takes up the impalpable cacao ingredient, diluting the impregnated solution thereof, and insuring its discharge through the nozzle $d^2$.

It will be seen that by this construction and arrangement of parts only a prescribed quantity of cocao syrup can be discharged at each dispensing operation, although more or less milk may be added thereto and passed through the measuring chamber $p^x$, into a receptacle held below the spout $d^2$, according to preference or requirements.

What I claim as my invention and desire to secure by Letters Patent is,

In liquid dispensing apparatus of the character designated, the combination of a container having a discharge duct, a dispensing faucet connected therewith and formed with a rotatable valve plug having a measuring chamber with a discharge port and with an inlet on one and the same side, the discharge port being communicatable with a discharge port of the container, and on the other side with an inlet communicatable with said discharge duct, and a floatable drain duct communicatable with said discharge duct and provided with buoyant means for maintaining its inlet port below the liquid level in the container, for the purpose described.

HARRY C. LYONS.

Witnesses:
 GEO. WM. MIATT,
 CHAS. E. MOSES.